United States Patent
Billarant

[19]

[11] Patent Number: 5,900,303
[45] Date of Patent: May 4, 1999

[54] FASTENER ASSEMBLY WITH MECHANICAL END SEALS

[75] Inventor: Patrick J. Billarant, Charlotte, N.C.

[73] Assignee: Aplix, Inc., Charlotte, N.C.

[21] Appl. No.: 08/940,622

[22] Filed: Sep. 30, 1997

[51] Int. Cl.⁶ .................................................. A44B 21/00
[52] U.S. Cl. ........................... 428/100; 428/99; 428/120; 428/900; 24/442
[58] Field of Search ............................ 428/99, 100, 120, 428/900; 24/442, 443

[56] References Cited

U.S. PATENT DOCUMENTS

| | | |
|---|---|---|
| 4,693,921 | 9/1987 | Billarant et al. . |
| 4,784,890 | 11/1988 | Black . |
| 4,802,939 | 2/1989 | Billarant et al. . |
| 4,814,036 | 3/1989 | Hatch . |
| 4,842,916 | 6/1989 | Ogawa et al. . |
| 4,881,997 | 11/1989 | Hatch . |
| 4,933,035 | 6/1990 | Billarant et al. . |
| 5,171,395 | 12/1992 | Gilcreast . |
| 5,180,618 | 1/1993 | Kessler . |
| 5,286,431 | 2/1994 | Banfield et al. . |
| 5,422,156 | 6/1995 | Billarant . |
| 5,500,268 | 3/1996 | Billarant . |
| 5,520,021 | 5/1996 | Clerici . |
| 5,606,781 | 3/1997 | Provost et al. . |
| 5,766,723 | 6/1998 | Oborny ................................... 428/100 |
| 5,786,061 | 7/1998 | Banfield ................................. 428/100 |

FOREIGN PATENT DOCUMENTS 0 621 118 A1   10/1994   France .

*Primary Examiner*—Alexander Thomas
*Attorney, Agent, or Firm*—Adams Law Firm, P.A.

[57] ABSTRACT

A fastener assembly for being molded into a foamed structure. The fastener assembly includes a base having first and second opposed major surfaces, first and second opposed ends, and first and second opposed side edges. A multiplicity of attachment members are carried by the base and extend outwardly from the first major surface of the base for mating with complementary attachment members. First and second spaced-apart end seals are attached to respective first and second opposed ends of the base for preventing intrusion of liquid foam past the ends of the base and onto the attachment members during molding of the structure. Each of the end seals defines a solid mass within which the attachment members are embedded. A multiplicity of spaced-apart anchors are carried by the base, and extend outwardly from the second major surface of the base for permanently attaching the fastener assembly to the foamed structure.

13 Claims, 7 Drawing Sheets

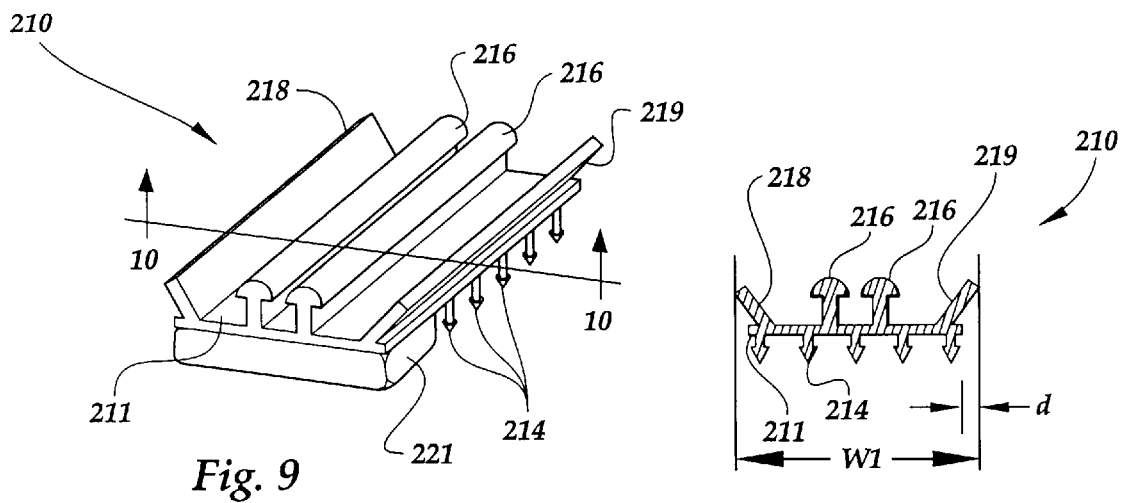
Fig. 9
Fig. 10
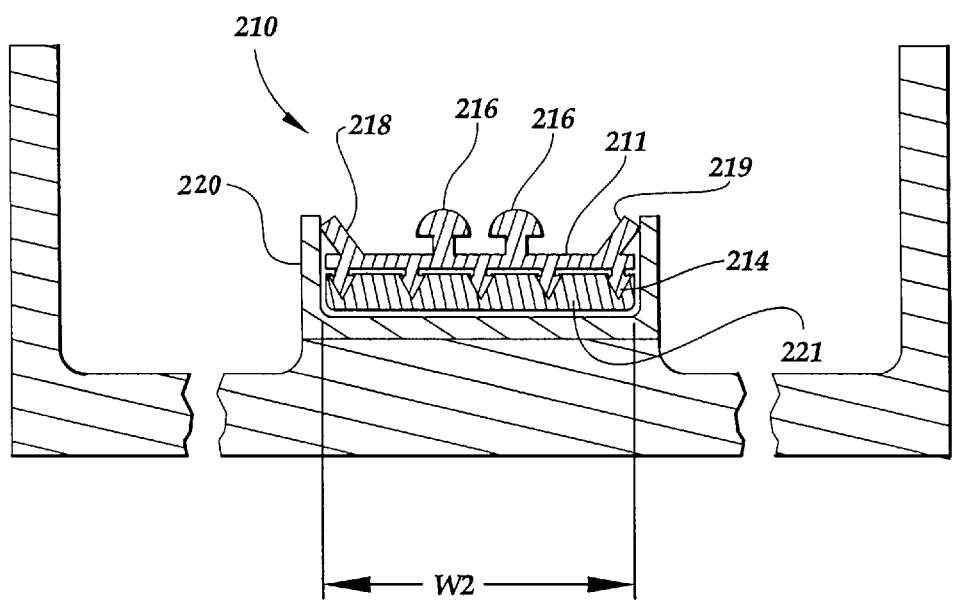
Fig. 11

FASTENER ASSEMBLY WITH MECHANICAL END SEALS

TECHNICAL FIELD AND BACKGROUND OF THE INVENTION

This invention relates to a fastener assembly of the type which is molded into foam structures, such as seat cushions. The fastener assembly according to the particular embodiment disclosed in this application cooperates with a complementary fastener assembly on an upholstery cover to hold the cover in place on the cushion. Hook and loop-type fasteners are a common type of fastener assembly used for this application.

Prior art patents in this field include Applicant's U.S. Pat. Nos. 4,693,921, 4,802,939, and 4,933,035. These patents disclose the provision of a thin plastic film which covers the attachment hooks to prevent intrusion of liquid foam into the area of the hooks during molding. Thus, the hooks do not become contaminated during molding and maintain their full ability to cooperate with the loops on the cover to keep the cover in place on the cushion. The film provides excellent protection against foam intrusion but must be removed from over the hooks after molding is complete according to one of several methods. Applicant has also employed metal shim stock material secured to the film and extending along the center of the fastener to hold the fastener in a mold having magnets.

U.S. Pat. No. 4,784,890 ('890 Patent) discloses a fastener which does not have an overlying plastic film covering the hooks, but relies on magnets to seal the fastener into the mold recess along the sides. The ends of the fastener are held in the mold recess by "restricting means", disclosed in the alternative as a length of polymeric film attached to and extending beyond the end of the fastener to be held in place by magnets in the mold, Col. 4, line 58-Col. 5, line 2; or "dam-like structures" which are placed on the ends of the fastener where the hooks have been removed by melting or cutting away the hooks to provide a flat area. Col. 5, lines 2–13. In the '890 Patent the magnetic material for protecting the ends is attached as a short tab to the end of the fastener and extends beyond the end of the fastener and over the marginal edge portions.

The present invention provides an efficient and inexpensive fastener which can be used without a protective film, and which does not require attachment of hold-down members which extend beyond the ends of the fastener.

SUMMARY OF THE INVENTION

Therefore, it is an object of the invention to provide a fastener assembly which does not require a cover over the attachment members to prevent foam intrusion during molding.

It is another object of the invention to provide a fastener assembly which is simple to manufacture.

It is another object of the invention to provide a fastener assembly which is inexpensive to manufacture.

It is another object of the invention to provide a fastener assembly which does not require any form of extension beyond the length of width of the fastener assembly.

It is another object of the invention to provide a fastener assembly which does not require attachment to the base in the area of the attachment members of extraneous devices such as staples or other magnetically attractable objects.

It is another object to provide a fastener assembly which is sufficiently flexible and conformable to the mold to permit it to be used in curved molds.

These and other objects of the present invention are achieved in the preferred embodiments disclosed below by providing a fastener assembly for being molded into a foamed structure. The fastener assembly includes a base having first and second opposed major surfaces, first and second opposed ends, and first and second opposed side edges. A multiplicity of attachment members are carried by the base and extend outwardly from the first major surface of the base for mating with complementary attachment members. First and second spaced-apart end seals are attached to respective first and second opposed ends of the base for preventing intrusion of liquid foam past the ends of the base and onto the attachment members during molding of the structure. Each of the end seals is a solid mass molded onto the first major surface of the base. A multiplicity of spaced-apart anchors are carried by the base and extend outwardly from the second major surface of the base for permanently attaching the fastener assembly to the foamed structure.

According to one preferred embodiment of the invention, the base includes opposed longitudinally-extending marginal areas adjacent the opposed side edges and devoid of attachment members.

According to another preferred embodiment of the invention, the first and second end seals are located between the marginal areas of the base.

According to yet another preferred embodiment of the invention, the opposed marginal areas extend the entire length of the base.

According to yet another preferred embodiment of the invention, first and second magnetically-attractable side edge sealing members are located in respective opposed marginal areas of the base for being attracted to magnets positioned in the mold in which the foamed structure is molded. The sealing members and magnets cooperate to form a foam-tight seal between the side edges of the base and the mold to prevent intrusion of liquid foam past the side edges of the base onto the attachment members of the base during molding of the structure.

According to yet another preferred embodiment of the invention, the first and second side edge sealing members are respective flexible strips including a magnetically attractable powder. The strips extend continuously the entire length of the base from the first opposed end to the second opposed end.

According to yet another preferred embodiment of the invention, the base, the attachment members and the anchors are integrally molded of thermoplastic material. The attachment members are a plurality of spaced-apart rows of hook-like projections extending along at least a portion of the length and across at least a portion of the width of the base.

According to yet another preferred embodiment of the invention, the base is elongate and the first and second opposed side edges extend longitudinally between the first and second opposed ends.

According to yet another preferred embodiment of the invention, the first and second end seals are formed of an elastomeric material.

According to yet another preferred embodiment of the invention, the first and second end seals are formed of plastic.

According to yet another preferred embodiment of the invention, first and second side edge sealing flanges are carried by the base, and project outwardly beyond respective side edges of the base. The sealing flanges cooperate with the mold to form a foam-tight seal between the side edges of the base and the mold to prevent intrusion of liquid foam past the side edges of the base onto the attachment members during molding of the structure.

According to yet another preferred embodiment of the invention, the first and second side edge sealing flanges diverge as they project outwardly to form an inwardly deformable seal against opposed side walls of the mold.

According to yet another preferred embodiment of the invention, each of the end seals is a solid mass within which the attachment members are embedded.

According to yet another preferred embodiment of the invention, the first and second end seals are molded onto the base in areas devoid of attachment members.

An embodiment of the method according to the invention comprises the steps of integrally molding the base and attachment members to form a fastener strip of indeterminate length. The sealing cover is then molded onto the base. The fastener strip and sealing cover are then laterally cut to form opposed ends of two like fastener assemblies. The portions of the sealing covers remaining on each of the fastener assemblies define opposed end seals adapted for preventing intrusion of liquid foam past the ends of the base and onto the attachment members of the fastener assembly during molding of a foamed structure.

According to one preferred embodiment of the method, the sealing cover is formed of an elastomeric material.

According to another preferred embodiment of the method, the step of molding the sealing cover includes molding the sealing cover over a predetermined length of attachment members.

According to yet another preferred embodiment of the method, the step of molding the sealing cover includes molding the sealing cover onto the base in an area devoid of attachment members.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 9 is a perspective view of an end portion of a fastener assembly according to an alternative embodiment of the present invention;

FIG. 10 is a cross-sectional view taken substantially along line 10—10 of FIG. 9;

FIG. 11 is an enlarged cross-sectional view showing the fastener assembly positioned in the mold during molding of the foamed seat;

DESCRIPTION OF THE PREFERRED EMBODIMENT AND BEST MODE

Figure 1:
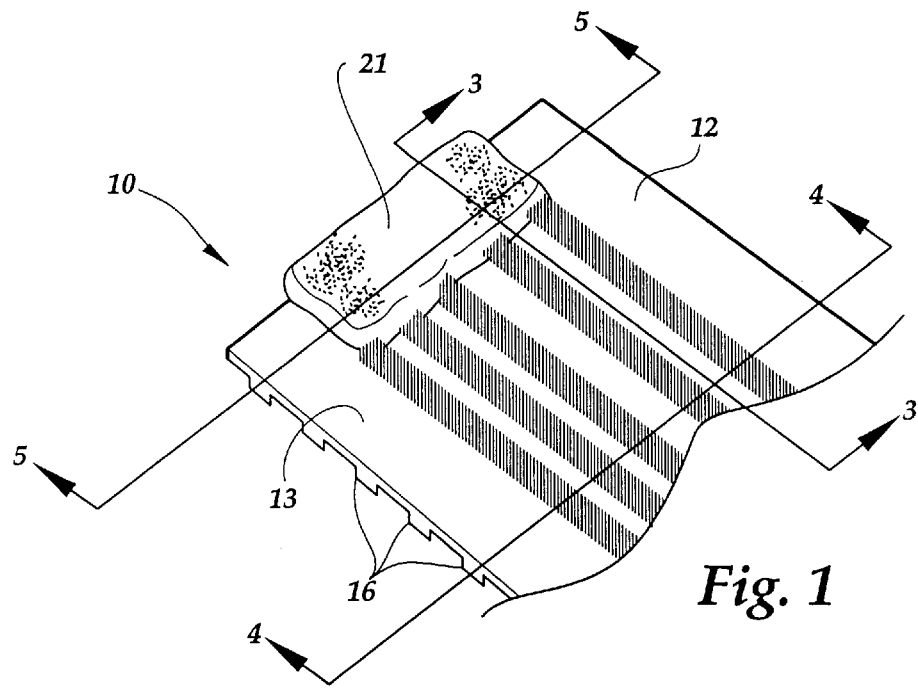
FIG. 1 is a perspective view of one end of a fastener assembly according to an embodiment of the invention, the other end being identical.
Figure 2:
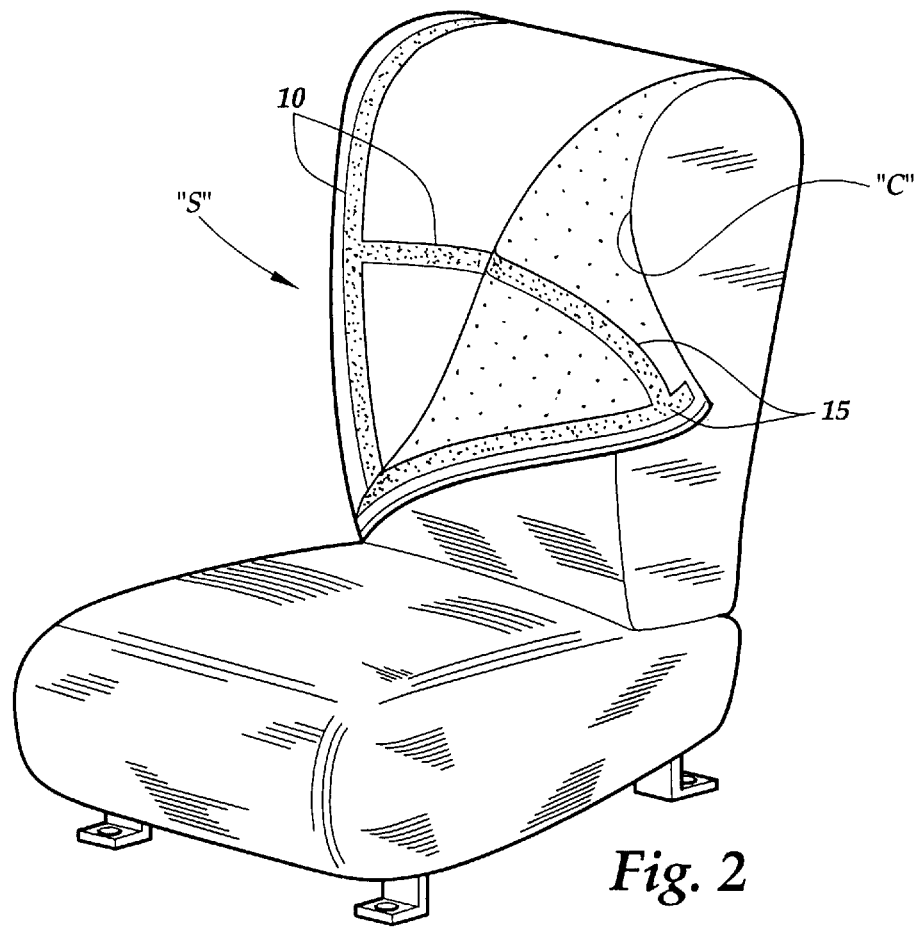
FIG. 2 is a perspective view of a foam seat cushion with a fastening member according to an embodiment of the invention molded into place to receive complementary attachment members of a seat cover.

Referring now specifically to the drawings, a fastener assembly according to the present invention is illustrated in FIG. 1 and shown generally at reference numeral 10. FIG. 2 shows the fastener assembly 10 in the environment of a polyurethane foam molded vehicle seat "S". Fastener assembly 10 can be molded into the seat bottom or backrest in any desired pattern or arrangement to accommodate the design of the seat and of the seat cover "C". The fastener assembly 10 also has application in many other structures, such as headliners and in furniture. As is apparent from FIG. 2, the fastener assembly 10 may be quite long, and its length is not pertinent to the invention of this application. Only one end and a short adjacent length of the fastener assembly 10 is shown in FIG. 1.

Fastener assembly 10 includes a base 11 of a molded plastic material, and including opposed ends and opposed side edges. The side edges define flat marginal areas 12 and 13. The base 11 carries several parallel rows of attachment members in the form of relatively small, outwardly extending hooks 14 on one of its major surfaces. See also FIG. 4 for a more detailed view. These hooks 14 are intended to mate with strips 15 of complementary loose, fibrous, nonwoven material attached to and carried by the seat cover "C" which is to be eventually placed over the foam cushions of the seat "S". See FIG. 2. The hooks 14 are ensnared in the fibrous material of the strips 15 and provide a secure attachment which can nevertheless be loosened when necessary by pulling the strips 15 away from the fastener assembly 10.

Figure 4:
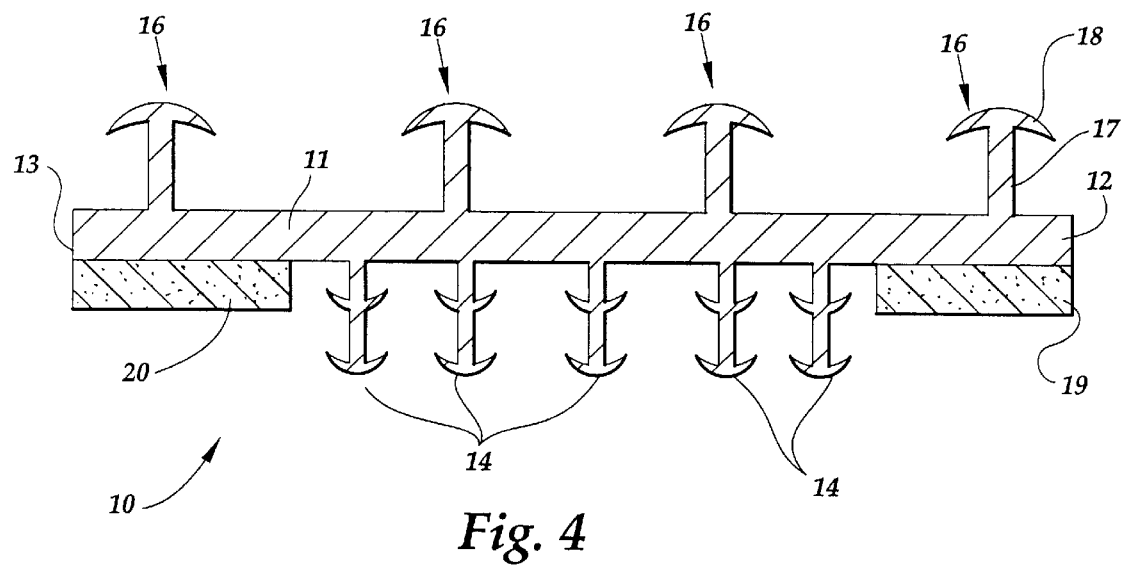
FIG. 4 is an enlarged and more detailed inverted vertical cross-section taken substantially along line 4—4 of the fastener assembly shown in FIG. 1.

Several rows of anchoring elements, such as anchors 16, are integrally molded into the major surface of the base 11 opposite the hooks 14. As is shown in FIG. 4, these anchors 16 have outwardly extending stems 17 carrying enlarged heads 18. The heads 18 may be of any suitable shape, but as shown are "anchor" shaped in lateral cross-section to provide enlarged surfaces which are molded into the foam and which provide substantial resistance against being dislodged once the molding process is completed and the foam is cured.

Figure 3:
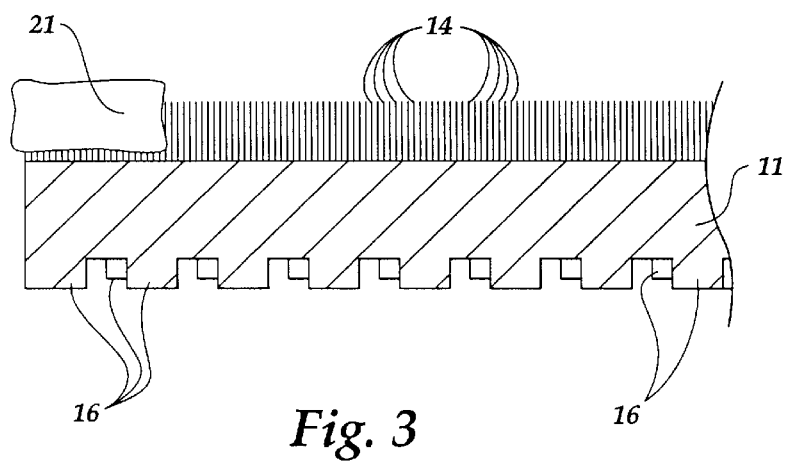
FIG. 3 is a vertical cross-section taken along the longitudinal axis of the fastener assembly, and substantially along line 3—3 of FIG. 1.

As best shown in FIG. 3, the anchors 16 are elongated along the length of the base 11 to provide greater gripping surface area for the foam.

Figure 5:
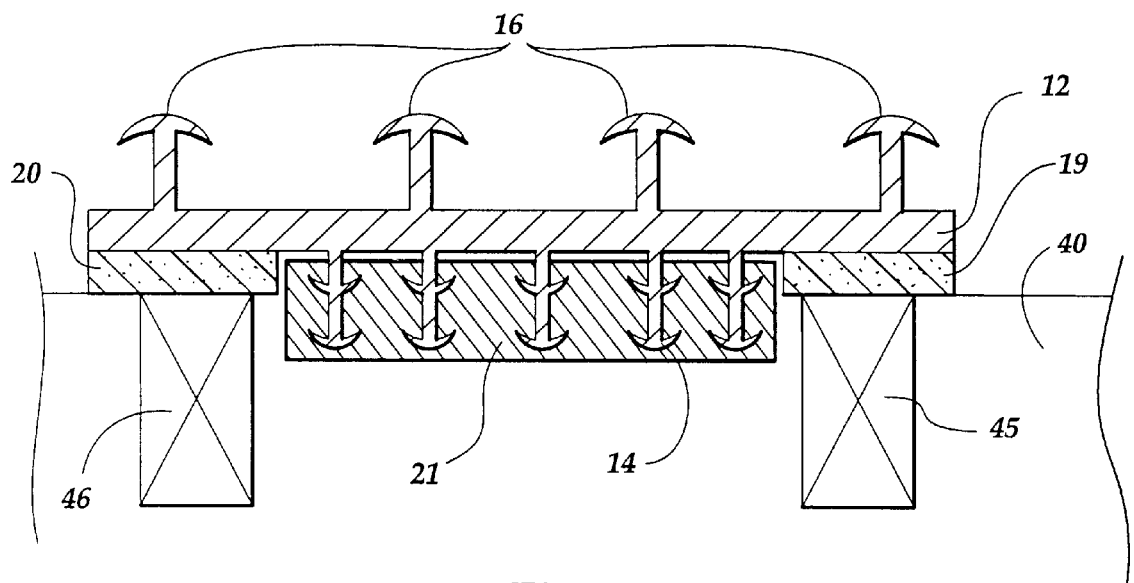
FIG. 5 is an enlarged and more detailed vertical cross-section taken substantially along line 5—5 of the fastener assembly shown in FIG. 1, and shown inverted in molding position in a mold recess.

Referring now to FIG. 5, the anchors 16 project outwardly away from a mold insert 40 and are intended to be immersed in the molding liquid when the molding process begins.

In the preferred embodiment of this application, the base 11, the hooks 14, and the anchors 16 are integrally molded of any suitable thermoplastic material known in the prior art.

As is best shown in FIG. 4, flexible plastic strips containing a magnetically attractable powder, such as strontium ferrite, form side seals 19 and 20. According to one embodiment, side seals 19 and 20 are attached by a suitable adhesive to respective marginal areas 12 and 13, and extend along the side edges of the base 11 from one end to the other. Alternatively, the base 11 may incorporate a magnetically attractable metal shim to hold the base 11 to magnets in the mold 40.

It should be emphasized that both ends of the fastener assembly 10 are identical. As best shown in FIGS. 1 and 3, each end includes an end seal 21 preferably formed of a no-tack or low-tack elastomeric hot-melt adhesive which is applied directly over a portion of the hooks 14, and dried to form a rubbery block or mass. When the fastener assembly 10 is positioned in the mold 40, as shown in FIG. 5, the end seal 21 acts to seal the end of the base 11 and prevent intrusion of liquid foam onto the hooks 14 during molding of the cushion. Preferably, the end seal 21 does not extend into the marginal areas 12 and 13, and thus does not disrupt operation of the side seals 19 and 20 at the ends of the base 11.

Alternatively, each end seal 21 is formed of a thermosetting plastic material which is molded onto the end of the base 11 in an area devoid of hooks 14, and which extends into the marginal areas 12 and 13 of the base 11.

After molding, the opposed end seals 21 of the fastener assembly 10 cooperate to prevent or minimize any damage caused to the foamed seat "S" resulting from removal and repositioning of the seat cover "C" over the seat "S". The end seals 21 block mating attachment of those hooks 14 covered by the seals 21 with the complementary fastener strips 15 of the seat cover "C". This reduces the overall pull at the ends of the fastener assembly 10 when the attachment hooks 14 of the seat are separated from the strips 15 of the seat cover, and eliminates or reduces the tendency of the assembly 10 to pull out of the foam seat "S".

Figure 6:
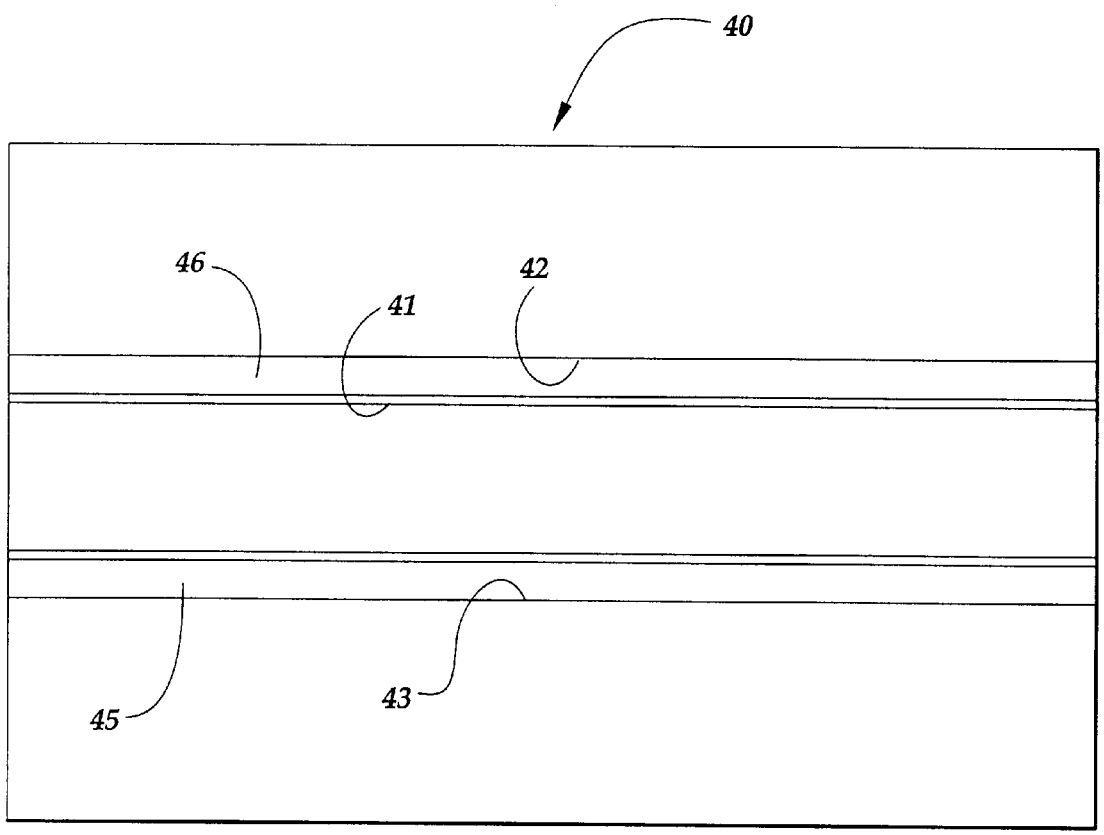
FIG. 6 is a top plan view of a mold insert according to the invention for receiving a fastener assembly according to an embodiment of the invention.

As shown in FIGS. 5 and 6, the mold insert 40 includes a steel block having a predetermined width and length of a size suitable to accommodate a fastener assembly 10 of a required length. Mold insert 40 fits into a recess in the surface of a cushion mold (not shown) and resides substantially flush with the cushion mold surface. Mold insert 40 includes a longitudinally extending fastener recess 41 into which the fastener assembly 10 is placed. Side magnet recesses 42 and 43 receive elongate side magnets 45 and 46. These side magnets 45 and 46 are positioned directly beneath the side seals 19 and 20 and magnetically attract the marginal areas 12 and 13 of the fastener assembly 10, thus sealing the longitudinal side edges of the fastener assembly 10 against the mold insert 40.

In an exemplary embodiment of the invention, the base 11 is one inch wide and has 5 rows of hooks 14 equally spaced from each other. The marginal areas 12 and 13 are each ¼ inch wide. The fastener assembly 10 has 33 hooks 14 per row per linear inch, or, for example, 1650 hooks 14 (33× 5×10") on a fastener assembly 10 ten inches long.

Figure 7:
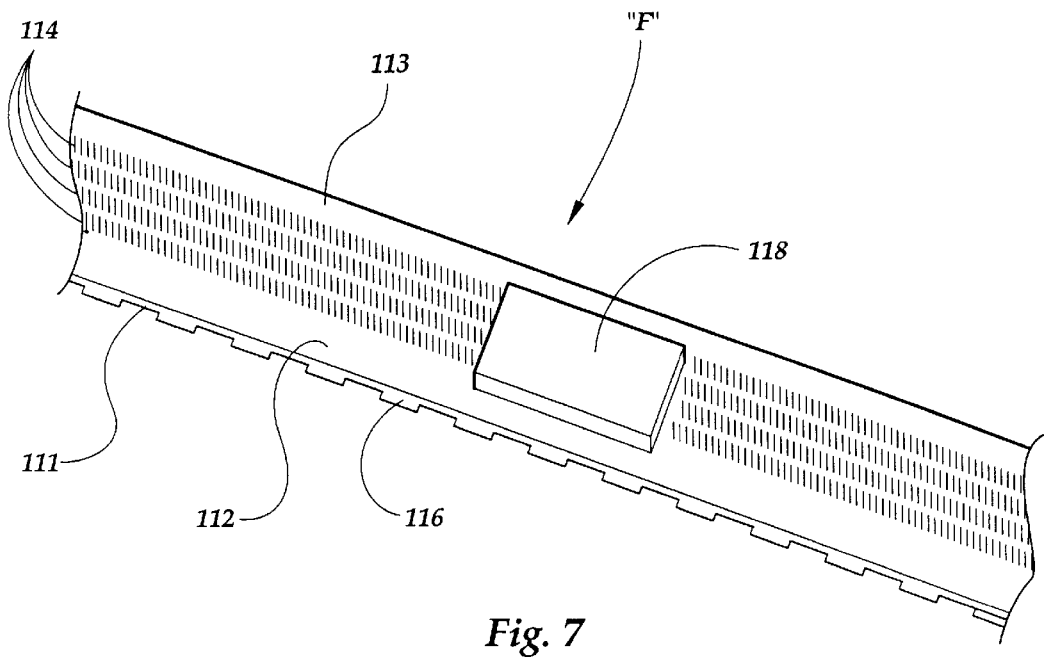
FIG. 7 is a perspective view of a fastener strip of indefinite length for being laterally cut to form respective ends of two like fastener assemblies.
Figure 8:
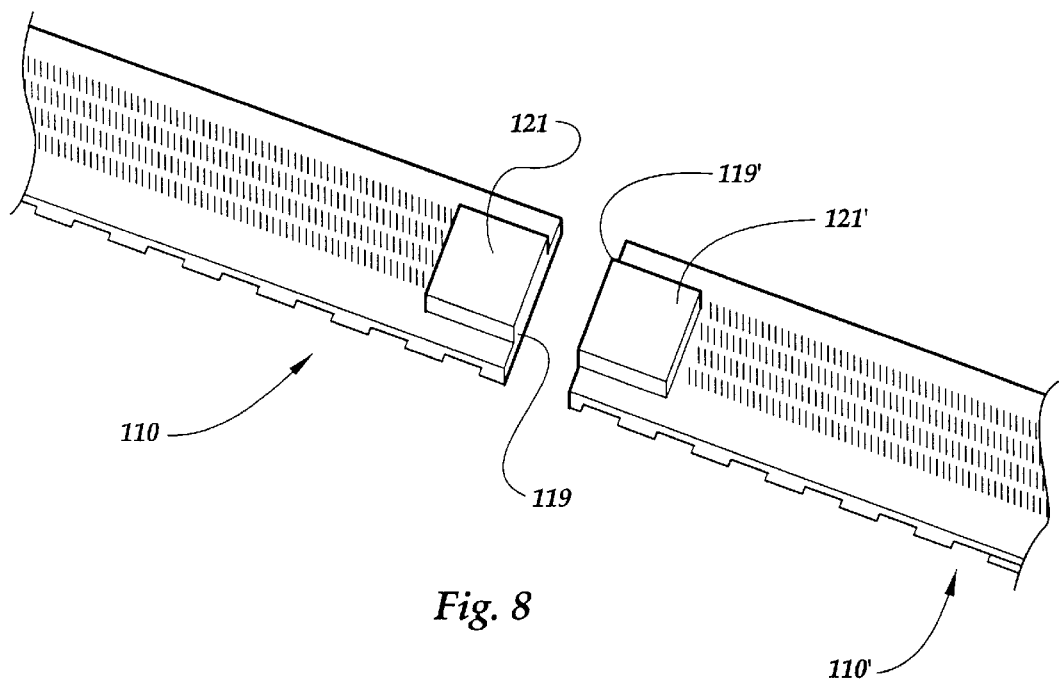
FIG. 8 is a perspective view of the fastener strip after being cut, and showing the like ends of the fastener assemblies.

According to another embodiment shown in FIGS. 7 and 8, separate fastener assemblies 110 and 110' are formed from a single fastener strip "F" of indeterminate length and including a base 111 having marginal areas 112 and 113 carrying integrally-formed rows of hooks 114 and anchors 116. A thermosetting, molded plastic cover 118 is applied over a predetermined length of the hooks 114 between the marginal areas 112 and 113 of the base 111. A lateral cut made through the center of the cover 118 and base 111 forms respective ends 119 and 119' of the fastener assemblies 110 and 110', as shown in FIG. 8. The portions of the cover 118 remaining on the fastener assemblies 110 and 110' define end seals 121 and 121'. The opposite ends of each fastener assembly 110 and 110' are formed in an identical manner. As described above, the end seals 121 and 121' block the flow of liquid foam past the ends of the base to the hooks during molding.

A further embodiment of a fastener assembly 210 according to the invention is shown in FIGS. 9–11. The fastener assembly 210 includes a base 211 carrying integrally-formed rows of hooks 214 and anchors 216, and first and second opposed side edge sealing flanges 218 and 219. The side edge sealing flanges 218 and 219 extend along the entire length of the base 211 from one end to the other, and are angled outwardly a distance "d" towards the side flanges of the mold 220 (See FIG. 11). The overall width "W1" of the fastener assembly 210 preferably corresponds to the width "W2" of the mold recess, as indicated in FIGS. 10 and 11.

Referring to FIG. 11, the side edge sealing flanges 218 and 219 cooperate with the side walls of the mold 220 to form a foam-tight seal between the side edges of the fastener assembly 210 and the mold 220 to prevent intrusion of liquid foam past the side edges of the base 211 and onto the hooks 214 during molding of the foamed seat. In addition, the flanges 218 and 219 can include enlarged heads (not shown) having profiles adapted to provide enhance sealing along the side walls of the mold 22. The end seals 221, such as described above, prevent intrusion of liquid foam past the ends of the base 211.

Figure 12:
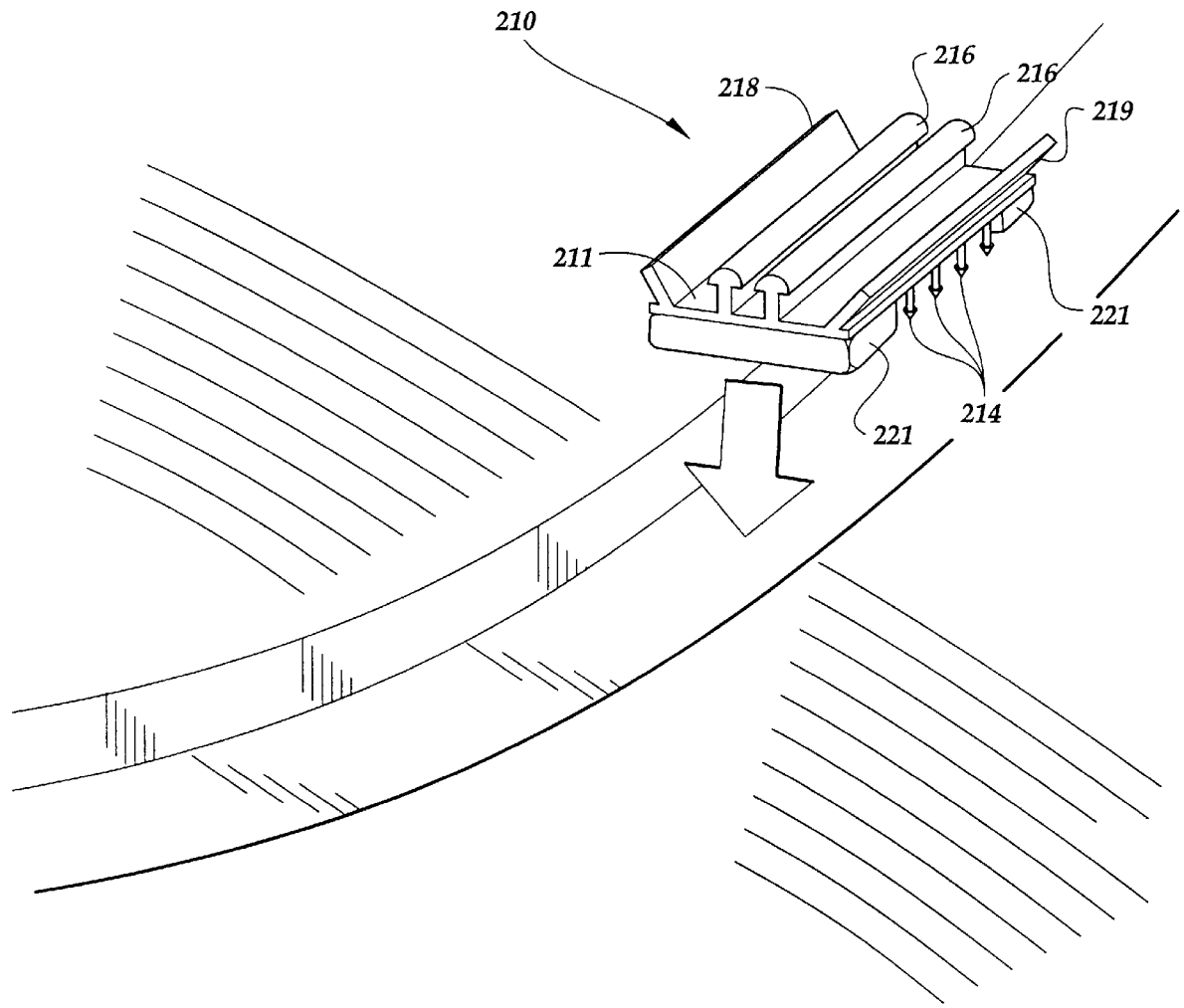
FIG. 12 is a fragmentary exploded perspective view of a short length of a fastener assembly shown in FIGS. 9, 10 and 11, for being positioned in a long, curved mold.
Figure 13:
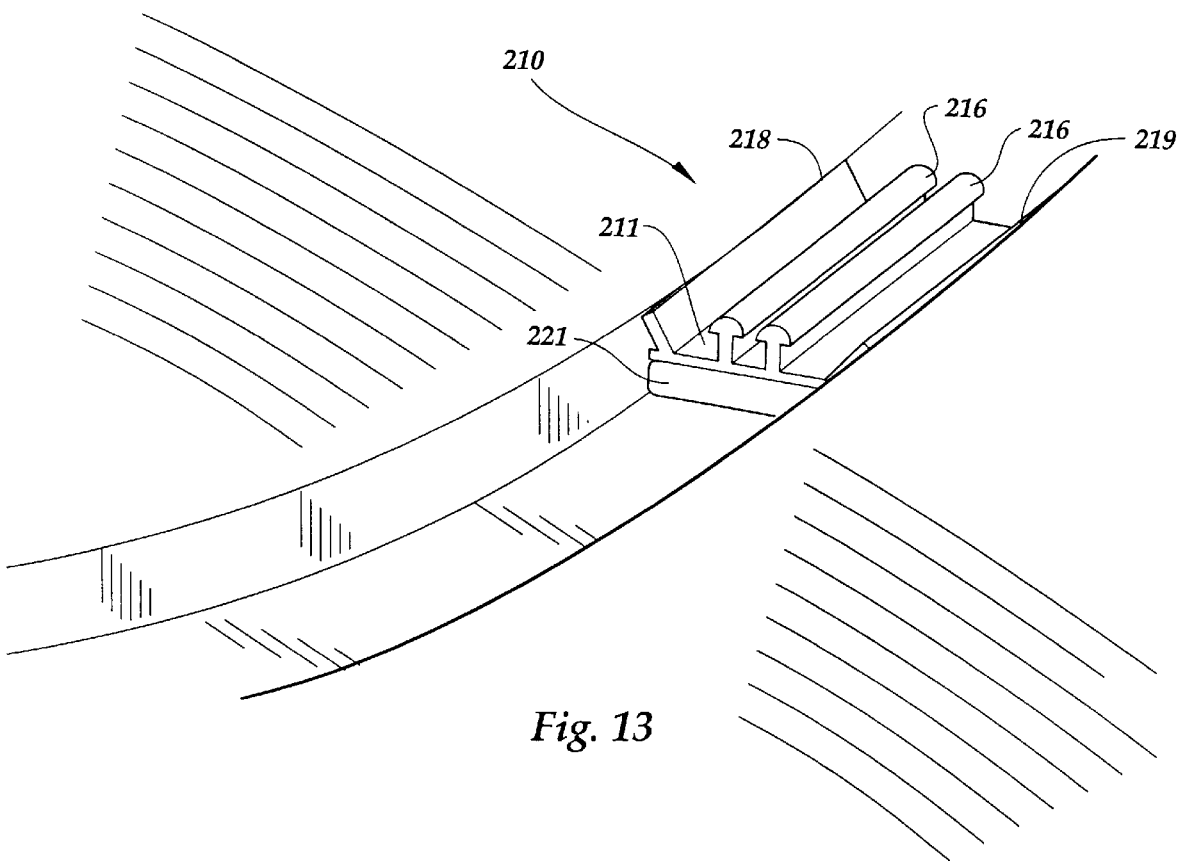
FIG. 13 shows the fastener assembly positioned in the curved mold.

Referring to FIG. 12, short lengths of the fastener assembly 210 can be inserted into a curved or sinuous mold cavity 220, leaving empty lengths of the mold cavity between the spaced-apart fastener assemblies 210. The flanges 218 and 219 of the fastener assembly 210 are sufficiently flexible to seal to the walls of a curved mold segment. The short lengths of fastener assemblies 210 are positioned to mate with complementary lengths of fasteners on, for example, the inside of an automobile seat cover positioned over the seat cushion. Liquid foam will fill the empty portions of the molds, leaving the top of the hooks 214 flush with the surface of the cushion. As described above, the end seals 221 prevent intrusion of foam into the array of hooks 214, while the seals 218 and 219 prevent intrusion of foam along the sides of the fastener assembly 210. This arrangement enables a very low profile attachment assembly which minimizes thickness of the overall assembly while providing excellent securement of the two elements being joined.

A fastener assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A fastener assembly adapted for being molded into a foamed structure using a mold having a curved mold recess and curved side walls, said fastener assembly comprising:
   (a) a base having first and second opposed major surfaces, first and second opposed ends, and first and second straight longitudinal side edges;
   (b) a multiplicity of attachment members carried by the base and extending outwardly from the first major surface of the base for mating with complementary attachment members, and said attachment members extending outwardly into the curved mold recess during the molding process;

(c) first and second spaced-apart end seals attached to respective first and second opposed ends of the base and extending outwardly from said first major surface and into the curved mold recess during the molding process for preventing intrusion of liquid foam past the ends of the base and onto the attachment members during formation of the structure, each of said end seals comprising a solid mass molded onto the first major surface of the base;

(d) first and second flexible side edge sealing flanges carried by the base and projecting outwardly from the second major surface beyond respective straight side edges of the base;

(e) the length of said base being sufficiently short and said side edge sealing flanges being sufficiently flexible such that said side edge sealing flanges engage the curved side walls of the mold and form a foam-tight seal between the straight side edges of the base and the mold to prevent intrusion of liquid foam past the straight side edges of the base onto the attachment members during molding of the foamed structure; and (f) a multiplicity of spaced-apart anchors carried by the base and extending outwardly from the second major surface of the base for permanently attaching the fastener assembly to the foamed structure.

2. A fastener assembly according to claim 1, wherein said base includes opposed longitudinally-extending marginal areas adjacent the opposed side edges and devoid of attachment members.

3. A fastener assembly according to claim 2, wherein said first and second end seals are located between the marginal areas of the base.

4. A fastener assembly according to claim 3, wherein the opposed marginal areas extend the entire length of the base.

5. A fastener assembly according to claim 4, and including first and second magnetically-attractableside edge sealing members located in respective opposed marginal areas of said base for being attracted to magnets positioned in the mold in which the foamed structure is molded to form a foam-tight seal between the side edges of the base and the mold to prevent intrusion of liquid foam past the side edges of the base onto the attachment members of the base during molding of the structure.

6. A fastener assembly according to claim 5, wherein said first and second side edge sealing members comprise respective flexible strips including a magnetically attractable powder, and extending continuously the entire length of the base from the first opposed end to the second opposed end.

7. A fastening assembly according to claim 1, wherein said base, said attachment members and said anchors are integrally molded of thermoplastic material, and said attachment members comprise a plurality of spaced-apart rows of hook-like projections extending along at least a portion of the length and across at least a portion of the width of the base.

8. A fastening assembly according to claim 1, wherein said base is elongate and said first and second opposed side edges extend longitudinally between the first and second opposed ends.

9. A fastener assembly according to claim 1, wherein said first and second end seals are formed of an elastomeric material.

10. A fastener assembly according to claim 1, wherein said first and second end seals are formed of plastic.

11. A fastener assembly according to claim 1, wherein the first and second side edge sealing flanges diverge as they project outwardly to form an inwardly deformable seal against opposed side walls of the mold.

12. A fastener assembly according to claim 1, wherein each of said end seals comprise a solid mass within which said attachment members are embedded.

13. A fastener assembly according to claim 1, wherein said first and second end seals are molded onto the base in areas devoid of attachment members.

* * * * *